United States Patent Office
3,394,141
Patented July 23, 1968

3,394,141
2-BENZYAMINOBENZIMIDAZOLES
Fabio Sparatore, Via Principe di Piemonte 3,
Sassari, Italy
No Drawing. Filed Nov. 12, 1965, Ser. No. 507,540
8 Claims. (Cl. 260—294.7)

This invention relates to certain novel compounds of value as anti-inflammatory and antipyretic agents and, more particularly, to certain 1-(1'-quinolizidinylmethyl)-2 - (lower)alkoxybenzyl-5-trifluoromethylbenzimidazoles and their nontoxic, pharmaceutically acceptable acid addition salts.

It was the object of the present invention to provide novel and nontoxic anti-inflammatory and antipyretic agents. It was a further object of the present invention to provide such agents which are also readily absorbed upon oral administration to mammals. It was a final object of the present invention to provide anti-inflammatory agents which include in their spectrum of activity an analgesic component of the aspirin type without the toxic side-effects, such as respiratory depression and addiction, which are found in analgesics of the morphine type.

The objects of the present invention have been attained by the provision, according to the present invention, of the compounds of the formula

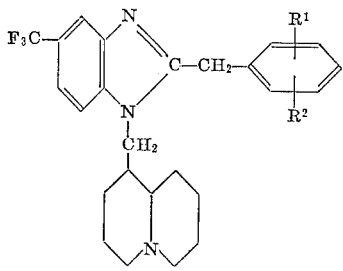

wherein $R^1$ represents (lower)alkoxy and $R^2$ represents hydrogen or (lower)alkoxy or, when taken together and being located on adjoining carbon atoms, represent methylenedioxy; and nontoxic, pharmaceutically acceptable acid addition salts thereof.

A preferred embodiment of the present invention comprises the compounds of the formula

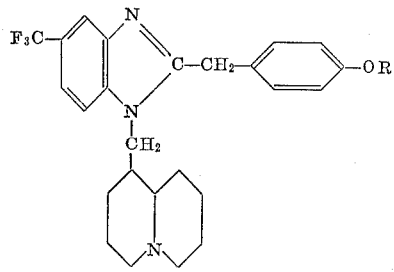

wherein R represents (lower)alkyl; and nontoxic, pharmaceutically acceptable acid addition salts thereof.

The numbering of the quinolizidine (norlupinane) ring

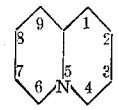

used herein is as given for RR1–1687 in Patterson's Ring Index, second ed. (1960).

As used herein the term "(lower)alkyl" signifies monovalent aliphatic radicals, whether branched or unbranched, which contain from one to six carbon atoms, inclusive, e.g., methyl, ethyl, propyl, isopropyl, n-butyl, sec.-butyl, tert.-butyl, isobutyl, n-hexyl, isohexyl, etc.

Included within the present invention are the acid addition salts prepared by reaction of these basic compounds with organic and inorganic acids such as hydrochloric acid, hydrobromic acid, sulfuric acid, phosphoric acid, acetic acid, maleic acid, tartaric acid, citric acid, sulfamic acid, glycolic acid, succinic acid, ascorbic acid and the like.

The compounds of the present invention are prepared by the reaction of the compound of the formula

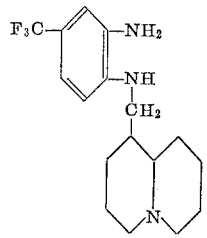

with a compound of the formula

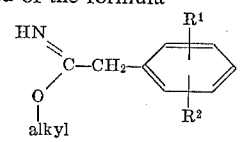

(in which $R^1$ and $R^2$ have the meaning set forth above) or its functional equivalent as a ring-closing agent to form 2-benzyl-benzimidazoles. Such functional equivalents include corresponding phenylacetic acids, esters of phenylacetic acids and benzyl nitriles. It is also possible to carry out the condensation with a phenylacetaldehyde and then oxidize the product thus formed. In addition, the starting materials can also be formed during the reaction; thus, for example, a 4-trifluoromethyl-2-phenylacetylamino-N-quinolizidinylmethylaniline may be subjected to ring closure, as by heating to about 180° C.

The reactions of the present process are carried out in the absence or presence of a diluent and/or a condensing agent and, when desired, at elevated temperature and/or pressure to increase the rate of the reaction. In a preferred method of practising the present invention the appropriate benzyl nitrile is converted in chloroform with one equivalent of ethanol and gaseous hydrogen chloride to the imino-ether hydrochloride which is then reacted with 5-trifluoromethyl-2-quinolizidinylmethylamino-aniline in chloroform, dioxane or glacial acetic acid at about 40°–60° C. to form the desired benzimidazole.

The desired benzyl nitriles (also called benzyl cyanides) of the formula

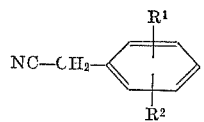

wherein $R^1$ and $R^2$ have the meaning set forth above, are prepared as reported in the literature, and in addition, compounds such as p-(n-propyloxy)benzyl nitrile can also be prepared from p-hydroxybenzyl nitrile by alkylation of its sodium salt with the corresponding alkyl halide; see A. Hunger et al., Helvetica Chimica Acta, 43, 800–809 (1960), especially page 808.

The starting material of the formula

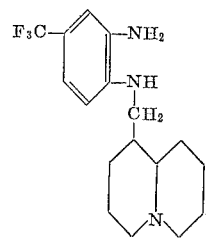

called 5-trifluoromethyl-2-quinolizidinylmethylamino-aniline, is prepared as exemplified below from 2-chloro-5-trifluoromethyl-nitrobenzene and quinolizidinylmethylamine. The preparation of the latter has been described by F. Sparatore, Annali di Chimica 52, 259–270 (1962).

Thus, a preferred reaction scheme for making the compounds of the present invention is the following, in which $R^1$ and $R^2$ have the meaning set forth above:

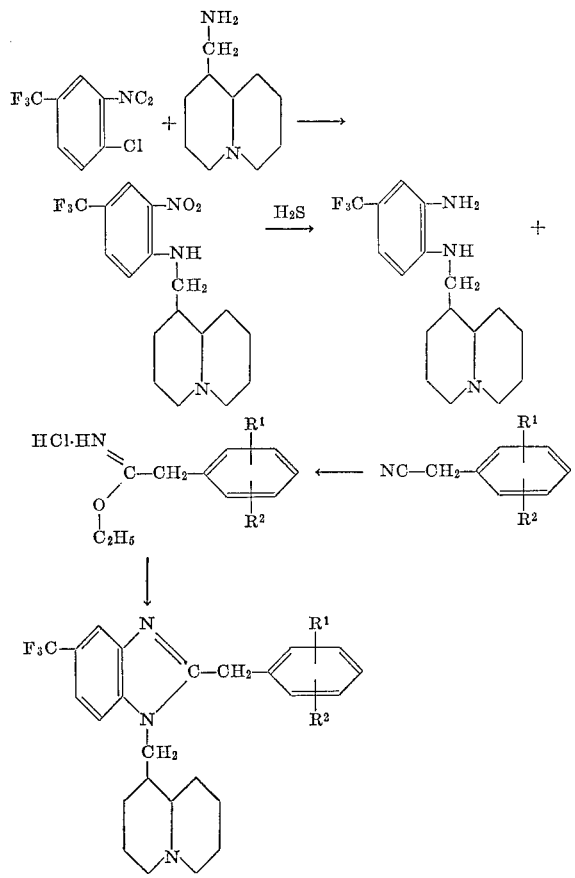

Anti-inflammatory tests of the compounds of the present invention were carried out on rats using the carrageenin-induced foot edema test of Charles A. Winter et al., Carrageenin Induced Edema in Hind Paw of the Rat as an Assay for Anti-inflammatory Drugs, Proceedings of the Society for Experimental Biology and Medicine, III, 544 (1962). The compound under investigation was given orally to the rat at a dose of 100 mg./kg., unless indicated otherwise, and one hour later carrageenin was injected subcutaneously into one hind paw and saline into the other (0.1 ml. of each). Three hours later the degree of edema was measured volumetrically by fluid displacement and compared to that of the control (saline) paw to give a result presented in terms of percentage inhibition of edema. Any result of more than 30% inhibition was greater than three times the standard deviation of the result in control animals and thus clearly indicated anti-inflammatory activity.

The percentage inhibition of edema observed with standard compounds at the same dosage was aspirin, 24%; phenylbutazone, 55%; and flufenamic acid, 47%.

A preferred embodiment of present invention, 1-(1'-quinolizidinylmethyl)-2-(4' - methoxybenzyl)-5-trifluoromethylbenzimidazole, exhibited an oral $LD_{50}$ in mice of about 700 mgm./kg. and exhibited significant anti-inflammatory activity in the above-described test at oral doses as low as 75 mgm./kg.

Antipyretic tests of the compounds of the present invention were carried out in rats using the pyretogenic effect of bacterial lipopolysaccharide as described by Charles A. Winter et al., Toxicology and Applied Pharmacology 5, 247–256 (1963). Each rat was injected intravenously via a tail vein with 25 mcg./kg. (made up in 0.9% saline) of standard, commercial *E. coli* lipopolysaccharide. One hour later the test animals were given a compound orally using five animals for each dosage level of each compound. At suitable intervals, e.g. every 30 minutes, rectal temperatures were taken with a thermocouple and an electric thermometer. Antipyretic activity was not considered significant unless the percent inhibition, as determined from comparing the mean temperature index obtained with the treated animals to that obtained with the control animals was >30%. The term "control rats" refers to those treated with *E. coli* polysaccharide but not with a compound. In this test aspirin showed significant antipyretic activity at 40 mgm./kg. p.o. but not at 10 mgm./kg. p.o.

A preferred embodiment of the present invention, 1-(1'-quinolizidinylmethyl) - 2-(4'-methoxybenzyl)-5-trifluoromethylbenzimidazole, exhibited significant antipyretic activity in the above-described test at oral doses as low as 16 mgm./kg. This compound was also found to be not active as a morphine antagonist at 50 mgm./kg. p.o. and to fail to display morphine-type analgesia at 50 mgm./kg. s.c. in the rat tail flick test.

These findings were particularly surprising in view of the absence of significant anti-inflammatory activity by the above-described foot edema test at oral dosages of 150 mgm./kg. in the compounds prepared by analogous methods which had the following structures:

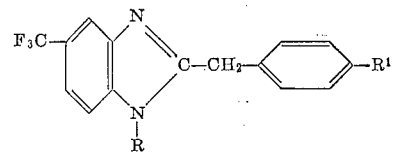

| R | $R^1$ | M.P. |
|---|---|---|
| -CH$_2$CH$_2$-N(C$_2$H$_5$)(C$_2$H$_5$) | H | 65° C. |
|  | Cl | 86° C. |
|  | -OCH$_3$ | 102-103° C. |
| -CH$_2$CH$_2$CH$_2$-N(CH$_3$)(CH$_3$) | H | 66-67° C. |
|  | Cl | 64-65° C. |
|  | -OCH$_3$ | 65° C. |
| -CH$_2$-(quinolizidinyl) | H | 59-60° C. (hydrate). |
|  | Cl | 153-154° C. |

The following examples will serve to illustrate the present invention without limiting it thereto. All temperatures are given in degrees centigrade.

Example 1.—1-quinolizidinylmethyl-2-(4'-methoxybenzyl)-5-trifluoromethylbenzimidazole Step A.—1-quinolizidinylmethylamine (16.8 g., 0.1 mole) and dimethylformamide (15 ml.) are heated on an oil-bath to 140° C. while 1-chloro-2-nitro-4-trifluoromethylbenzene (25 g., 0.11 mole) is added dropwise. The mixture is then heated to a bath temperature of 195–200° C. for 90 minutes. The reaction mixture is dissolved in 2 N hydrochloric acid and extracted with ether. The aqueous acidic solution containing the desired intermediate (5-trifluoromethyl-2-quinolizidinylmethylamino-nitrobenzene) is made alkaline and again extracted with ether. The ethereal solution containing the desired intermediate is washed with water, dried and the solvent is removed to leave the intermediate as the residue in form suitable for use in the following steps. For purposes of analysis this product was converted to its hydrochloride, M.P. 260° C. from chloroform-ether.

Step B.—5 - trifluoromethyl - 2 - quinolizidinylmethyl-amino-nitrobenzene (0.05 mole, prepared as above) is dissolved in dry ethanol (20 ml. for each gram) and to the stirred solution there is slowly added 200 ml. concentrated ammonium hydroxide previously saturated at 0° C. with hydrogen sulfide. The mixture is stirred for sixteen hours while preventing access of air, as with a Bunsen valve. The solution is then evaporated under vacuo as completely as possible and the residue is triturated with 2 N hydrochloric acid and the sulfur is filtered off. The acidic solution is evaporated to dryness in vacuo to leave as the residue crude 5 - trifluoromethyl - 2-quinolizidinylmethyl-amino-aniline hydrochloride which can be used directly in the next step. If desired, it may be crystallized from absolute ethanol/ether after thorough drying in a desiccator over KOH.

If desired, the crude hydrochloride is dissolved in water and neutralized with sodium hydroxide and the free base is extracted into ether; after removal of the solvent the free base is obtained as an oil or low-melting solid.

Step C.—p-Methoxyphenylacetonitrile (0.04 mole) is dissolved in 40 ml. chloroform and 2.5 ml. dry ethanol and the solution is saturated with thoroughly dried hydrogen chloride at a temperature below 0° C. This solution is kept at about 18–20° overnight (13–14 hours) and then evaporated to dryness in vacuo without heating. The imino-ester-hydrochloride so obtained is mixed with 0.02 mole 5 - trifluoromethyl - 2 - quinolizidinylmethylamino-aniline and 50 ml. glacial acetic acid and stirred at 45° C. for 16 hours. After the addition of 10 ml. 2 N hydrochloric acid the mixture is evaporated to dryness in vacuo, triturated with water (50 ml.) and a few drops of dilute hydrochloric acid and extracted with ether, which is discarded. The acidic aqueous solution is made alkaline with ammonium hydroxide and again extracted with ether. The ethereal solution containing the product is washed with water and dried. Removal of the solvent leaves 1-(1'-quinolizidinylmethyl) - 2 - (4' - methoxybenzyl) - 5 - trifluoromethylbenzimidazole, which is obtained as a crystalline hydrate, M.P. 48° C., after recrystallization from petroleum ether.

Example 2

In the procedure of Example 1, Step C, the p-methoxyphenylacetonitrile used therein is replaced by 0.04 mole of p-ethoxyphenylacetonitrile,
p-isopropoxyphenylacetonitrile,
p-n-propoxyphenylacetonitrile,
p-n-butoxyphenylacetonitrile, and
m,p-methylenedioxyphenylacetonitrile, respectively,
to produce
1-(1'-quinolizidinylmethyl)-2-(4'-ethoxybenzyl)5-trifluoromethylbenzimidazole,
1-(1'-quinolizidinylmethyl)-2-(4'-isopropoxybenzyl)-5-trifluoromethylbenzimidazole,
1-(1'-quinolizidinylmethyl)-3-(4'-n-propoxybenzyl)-5-trifluoromethylbenzimidazole,
1-(1'-quinolizidinylmethyl)-2-(4'-n-butoxybenzyl)-5-trifluoromethylbenzimidazole, and
1-(1'-quinolizidinylmethyl)-2-(3'4'-methylenedioxy-benzyl)-5-trifluoromethylbenzimidazole, respectively.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. The compound of the formula

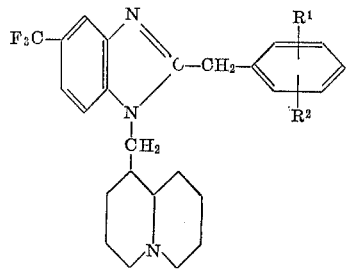

wherein $R^1$ represents (lower)alkoxy and $R^2$ represents hydrogen or (lower)alkoxy or, when taken together and being located on adjoining carbon atoms, represent methylenedioxy; and nontoxic, pharmaceutically acceptable acid addition salts thereof.

2. The compounds of the formula

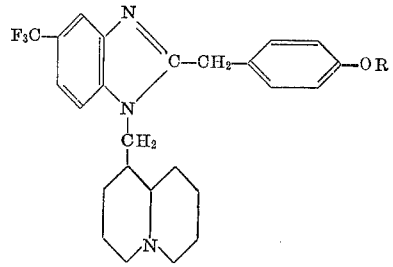

wherein R represents (lower)alkyl; and nontoxic, pharmaceutically acceptable acid addition salts thereof.

3. The compound of claim 2 wherein R represents methyl.

4. The compound of claim 2 wherein R represents ethyl.

5. The compound of claim 2 wherein R represents n-propyl.

6. The compound of claim 2 wherein R represents isopropyl.

7. The compound of claim 2 wherein R represents n-butyl.

8. The compound of the formula

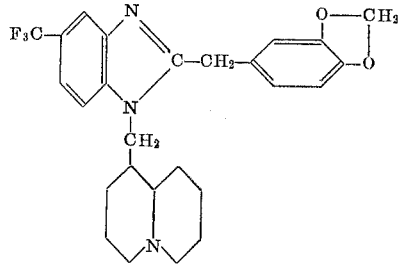

References Cited

UNITED STATES PATENTS 2,971,005    2/1961    Engelhardt _____ 260—294.7
3,000,898    9/1961    Hoffman et al. _____ 260—294.7

JAMES A. PATTEN, *Primary Examiner.*